United States Patent [19]

Okamoto et al.

[11] Patent Number: 4,544,610
[45] Date of Patent: Oct. 1, 1985

[54] HEAT-RESISTANT SPRING MADE OF FIBER-REINFORCED METALLIC COMPOSITE MATERIAL

[75] Inventors: Hideho Okamoto, Toyonaka; Ken-ichi Nishio, Ibaraki, both of Japan

[73] Assignee: Sumitomo Chemical Co., Ltd., Osaka, Japan

[21] Appl. No.: 361,756

[22] Filed: Mar. 25, 1982

Related U.S. Application Data

[63] Continuation of Ser. No. 180,870, Aug. 25, 1980, abandoned.

[30] Foreign Application Priority Data

Aug. 29, 1980 [JP]  Japan ................. 54-110762

[51] Int. Cl.⁴ ........................... F16F 1/04; F16F 1/18
[52] U.S. Cl. .................... 428/611; 428/614; 267/149
[58] Field of Search ............ 428/544, 607, 611, 614, 428/608, 629, 632, 633, 650–654, 323, 379, 389, 403, 539, 113; 106/57; 75/DIG. 1; 267/148, 149, 158, 166

[56] References Cited

U.S. PATENT DOCUMENTS

| | | | |
|---|---|---|---|
| 2,829,881 | 4/1958 | Morris | 267/149 |
| 3,098,723 | 7/1963 | Micks | 428/611 |
| 3,547,180 | 12/1970 | Cochran et al. | 428/614 |
| 3,691,623 | 9/1972 | Standhammer et al. | 428/614 |
| 3,890,690 | 6/1975 | Li | 428/614 |
| 3,970,136 | 7/1976 | Cannell et al. | 428/614 |
| 4,012,204 | 3/1977 | Riewald et al. | 75/DIG. 1 |
| 4,101,615 | 7/1978 | Horikiri et al. | 264/63 |
| 4,152,149 | 5/1979 | Horikiri et al. | 264/63 |
| 4,163,380 | 8/1979 | Masoner | 428/611 |
| 4,341,823 | 7/1982 | Sexton et al. | 428/614 |
| 4,444,603 | 4/1984 | Yamatsuta et al. | 428/614 |
| 4,450,207 | 5/1984 | Donomoto | 428/614 |
| 4,452,865 | 6/1984 | Yamatsuta et al. | 428/614 |
| 4,457,979 | 7/1984 | Donomoto et al. | 428/614 |
| 4,465,741 | 8/1984 | Yamatsuta et al. | 428/611 |

Primary Examiner—L. Dewayne Rutledge
Assistant Examiner—John J. Zimmerman
Attorney, Agent, or Firm—Birch, Stewart, Kolasch & Birch

[57] ABSTRACT

A spring useful as various machine parts or elements for various machines and apparatuses, which is made of a fiber-reinforced metallic composite material comprising a matrix metal (e.g. a metal having a melting point of not higher than 1,700° C.) and a reinforcement of an inorganic fiber having high modulus of elasticity and high strength selected from a ceramic fiber and a metallic fiber, particularly an alumina or alumina-silica fiber containing alumina of 100 to 72% by weight, preferably 98 to 75% by weight, and silica of 0 to 28% by weight, preferably 2 to 25% by weight, and having substantially no α-alumina reflection by X-ray diffraction. The spring of the present invention is light in weight and has far greater heat resistance and mechanical properties in comparison with the conventional metallic or non-metallic springs, and hence is particularly valuable from the standpoint of saving energy and saving resources.

3 Claims, 4 Drawing Figures

HEAT-RESISTANT SPRING MADE OF FIBER-REINFORCED METALLIC COMPOSITE MATERIAL

This application is a continuation, of application Ser. No. 180,870, filed on Aug. 25, 1980 now abandoned.

BACKGROUND OF THE INVENTION

The present invention relates to a heat-resistant springmade of a fiber-reinforced metal (hereinafter, referred to as "FRM"). More particularly, it relates to a novel light spring made of a fiber-reinforced metallic composite material, which has an excellent heat-resistance, i.e. dynamic and mechanical properties such as strength and modulus at elongation, bending or compression, the fatigue strength of the spring material not being deteriorated even at a lower or higher temperature as well as at room temperature.

A spring is usually used as a part or element of various machines and apparatus and is produced by forming an elastic material which is capable of absorbing an external force as an elastic energy into an appropriate shape. The spring is roughly classified into (1) a metallic spring (e.g. steel spring, non-ferrous metallic spring, etc.) and (2) a non-metallic spring (e.g. rubber spring, fluidic spring, etc.)

In order to select the most suitable spring for individual utility, various factors such as elastic coefficient, elastic limit, fatigue strength, heat resistance, corrosion resistance, fabrication quality, or coefficient of thermal expansion of the material should be taken into consideration.

As the metallic spring, there are known steel springs such as spring made of carbon steel or alloyed steel. These steel springs are suitable for practical use in view of excellent fabrication quality and are used in various shapes. However, these steel springs have drawbacks in that they have too large of a density such as 8-9 g/cm$^3$ and hence the strength and elasticity thereof are significantly decreased at a high temperature. For example, a carbon steel spring shows a working limit of temperature at 180° C., and even a stainless steel spring shows the working limit at about 310° C. (cf. "Spring Design" 2nd Ed., edited by Spring Technique Research Committee in Japan, issued by Maruzen, 1963, page 9). In order to improve the heat resistance of springs there may be used some non-ferrous metallic springs such as a copper alloyed spring, cobalt- or nickel-base spring. However, these non-ferrous metallic springs show still decreased strength and modulus of elasticity at a higher temperature. Thus, there has never been obtained a light, heat-resistant spring material having a large specific strength (i.e. strength/density) and a large specific modulus of elasticity (i.e. modulus of elasticity/density). Moreover, the conventional metallic springs usually rapidly decrease a fatigue breaking stress thereof at a repeating time of 10$^6$ times in fatigue test and hence they are hardly practically useful. Besides, a carbon steel spring is also inferior in corrosion resistance, and a steel spring shows unfavorably decreased absorption energy at a comparatively low temperature such as lower than the transition temperature of steel because of the rapid breaking thereof, that is, they show so-called brittleness at low temperature. (cf. "Springs" 2nd Ed., edited by Spring Technique Research Committee in Japan, issued by Maruzen, 1970, page 278).

As the non-metallic spring, there are known the rubber spring, fluidic spring, and further, fiber-reinforced resin (FRP) spring. (cf. Japanese Patent Publication (unexamined) Nos. 33962/1977, 33963/1977, 34161/1977, 36250/1977, and 56252/1977). As a spring made of FRP, there are known, for example, springs made of a thermosetting or thermoplastic resin which is reinforced with glass fiber or carbon fiber. The FRP is comparatively easily fabricated and has light weight and excellent mechanical properties, but it has a most important problem, that is it has a low heat resistance. For example, the spring made of polyimide resin reinforced by glass fiber has a heat resistance of lower than 300° C.

It has recently been feared that energy and resources in the world will be exhausted in the near future, and hence, it is necessary to save energy and resources in various fields. From this viewpoint, it is required to reduce the weight of various parts or elements of various transportations such as automobiles, airplanes, railway cars, and further various other machines and apparatuses. Moreover, from the standpoint of saving energy by enhancing the energy effeciency and giving high performance to the machines and apparatuses, it is required to improve the heat resistance of the parts and elements. By weight-saving or improving the heat resistance of the parts or elements, not only the parts or elements themselves but also whole machines or apparatuses or whole systems to which the parts or elements are incorporated will be improved. Accordingly, if there can be obtained a spring having an excellent heat resistance (i.e. the spring having similar mechanical properties even at a lower or higher temperature as those at room temperature) and having also light weight, it will be revolutionary in the machine and relative industries.

DESCRIPTION OF THE INVENTION

Figure 1:
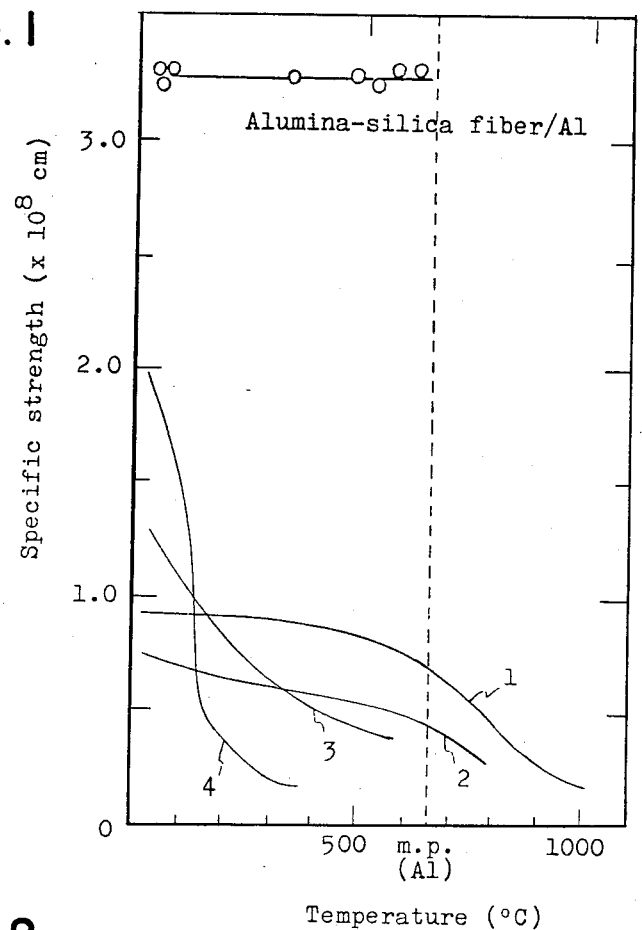
FIG. 1 shows the temperature dependence of specific tensile strength of the alumina-silica fiber-reinforced composite material.

From these viewpoints, the present inventors have intensively studied on the improvement of spring materials in order to eliminate the drawbacks of the conventional metallic springs and non-metallic springs materials (e.g. FRP). As a result, it has been found that the desired spring having excellent mechanical properties and excellent heat resistance can be obtained from a fiber-reinforced metallic composite material (FRM) which comprises a metal matrix and a reinforcement of inorganic fibers selected from a ceramic fiber or metallic fiber having a high modulus of elasticity and high strength.

An object of the present invention is to provide a novel fiber-reinforced metallic composite material suitable for a spring having excellent mechanical properties and excellent heat resistance. Another object of the invention is to provide a spring made of an inorganic fiber-reinforced metallic composite material. A further object of the invention is to provide a light spring made of an alumina or alumina-silica fiber-reinforced metallic composite material. These and other objects and advantages of the invention will be apparent to persons skilled in the art from the following description.

FRM materials are produced by way of trial for the purpose of use as a reinforcement for single metals such as lead, aluminum, copper, nickel or titanium and alloys of these metals. Although these FRM materials are similar to FRP in the form, process for the production thereof is still developing, and there still has not been found a practically useful FRM. FRM materials are different from FRP in reinforcing mechanism, interfacial reaction between fiber and matrix, and breaking mechanism due to impact or fatigue, and hence, the spring made of FRM is different from a spring made of FRP in quality.

Among the FRM materials, the novel alumina or alumina-silica fiber-reinforced metallic composite material, as described hereinafter, has characteristics that the composite structure can be formed without reaction between the fiber and metal and the product is light in weight in addition to exhibiting the characteristics of excellent mechanical properties and heat resistance. Thus, the alumina or alumina-silica fiber-reinforced composite material is particularly superior to the conventional spring materials and is useful for the production of springs for various machine elements in various industries such as spaceship, atomic power machines and trasportations.

Reinforcing fibers used include ceramics fibers or whiskers (e.g. fibers or whiskers of alumina, silica, alumina-silica, carbon, graphite, silicon carbide, zirconia, or boron), metallic fibers (e.g. tungsten fiber, stainless steel fiber), and iron whisker, and also include fibers coated with metals or ceramics (e.g. boron/silicon carbide fiber) which are produced by coating the surface of a fiber by means of (1) flame spray coating (plasma spray coating), (2) electrodeposition coating (electroplating, chemical plating), and (3) deposition coating (e.g. vacuum deposition, chemical vapor deposition, sputtering, ion plating).

Some of these reinforcing fibers used for FRM have, however, some drawbacks. For example, a boron fiber has a high strength, but it is inferior in flexibility because of its large fiber diameter as of about 100 μm, and further, in case of a matrix of aluminum alloy, a boron compound is easily produced at the interface of the fiber and matrix at a high temperature, which results in lowering of the strength of the FRM. In order to eliminate the latter drawback, the boron fiber is usually coated with silicon carbide, by which the undesirable reaction at the interface is "prevented, however, the resulting fiber is still unsatisfactory. Although" carbon fiber has also excellent strength and elasticity, in case of an aluminum alloy matrix, a brittle layer of $Al_4C_3$ is formed at the interface of fiber and matrix, which results in lowering of strength of the composite material. Moreover, since carbon fiber has a high electrical conductivity, galvanic corrosion occurs at the interface of fiber and matrix to result in lowering of strength of the composite material. Accordingly, this composite material is unfavorably an inferior resistance against corrosion, i.e. inferior resistance to saline solutions. Besides, since the carbon fiber exhibits poor wetting with aluminum in the liquid phase, it is desirable to coat the surface of the carbon fiber with metals or ceramics in order to give it good wetting with matrix metal and also to inhibit the undesirable reaction at the interface of fiber and matrix as mentioned above. This has somewhat succeeded, but it is very difficult and requires great skill to coat uniformly and with certainty carbon fibers with metals or ceramics because carbon fibers are so fine, i.e. they have a fiber diameter of 10 μm or less. Metallic fibers such as stainless steel fibers have comparatively larger diameter as 8 to 15 μm in average and has good flexibility, but they have a large specific weight as about 8 g/cm$^3$ and hence are not suitable for weight-saving of FRM. Moreover, in case of molten aluminum matrix, the metallic fibers easily react with the matrix to result in lowering of strength of the composite material.

Under the circumstances, it has been studied to find other combinations of various metals with various fibers in order to give a composite material having excellent properties. In the selection of the most suitable combination of fibers and metals, it is preferable to avoid combining a fiber and a metal which react significantly at the interface thereof, e.g. a combination of a glass fiber such as an E glass fiber with aluminum or aluminum alloy. Even in such an undesirable combination, if the undesirable reaction at the interface thereof can be inhibited by coating the surface of fibers with metals or ceramics, the combination may also be acceptable. It is also preferable to avoid selecting the combination wherein the fiber's mechanical properties significantly decrease (e.g. strength, modulus of elasticity) at a temperature range of around the melting point of the matrix metals. From these viewpoints, it is preferable to combine an aluminum matrix with a fiber selected from alumina fiber, alumina-silica fiber, and boron fiber coated with silicon carbide.

Among reinforcing fibers, the following alumina or alumina-silica fiber has great effect for reinforcing metals.

The alumina or alumina-silica fiber can be obtained in the form of continuous fibers having good handling properties (different from whisker), and have greater flexibility than boron fibers and also have a large oxidation resistance even at a high temperature, which can not be observed in the case of boron fibers and carbon fibers. Accordingly, the alumina or alumina-silica fiber is easily used for the production of metallic composite material. Moreover, the alumina or alumina-silica fiber does not easily react with various metals and has excellent mechanical properties and hence shows excellent specific strength and specific modulus of elasticity at a wide range i.e. temperature of from a low temperature to a high temperature, and it can produce composite materials having excellent creep characteristics at a high temperature, fatigue properties and impact resistance with various matrix metals.

The alumina fiber or alumina-silica fiber used in the present invention contains 100 to 72% by weight, preferably 98 to 75% by weight, of alumina ($Al_2O_3$) and 0 to 28% by weight, preferably 2 to 25% by weight, of silica ($SiO_2$). Within the content of silica and within not more than 10% by weight, preferably not more than 5% by weight, based on the total weight of the fiber, silica may be replaced by one or more kinds of oxides of various elements selected from lithium, beryllium, boron, sodium, magnesium, silicon, phosphorus, potassium, calcium, titanium, chromium, manganese, yttrium, zirconium, lanthanum, tungsten, and barium.

The alumina fiber and alumina-silica fiber are preferably observed to have no α-alumina reflection by X-ray diffraction. Generally, when an inorganic fiber is heated and calcined at a high temperature, the fiber-forming inorganic materials crystallize into small grains, and because of breaking between the crystallized grains, the fiber decreases significantly in strength. According to the present inventor's study, the growth of crystalline grains is characterized by the appearance of α-alumina reflection in the X-ray diffraction. Accordingly, the alumina fiber and alumina-silica fiber used in the present invention should be prepared so that no α-alumina reflection appears by X-ray diffraction.

The alumina fiber and alumina-silica fiber used in the present invention have the following excellent properties suitable for producing reinforced composite material. These fibers have a high tensile strength such as 10 t/cm$^2$ or more and high tensile modulus such as 1,000 t/cm$^2$ or more. Since they are composed of stable oxides, they do not deteriorate even when exposed to air at a high temperature such as 1,000° C. or higher for a long period of time. Since they contain predominantly alumina, they are stable and are hardly reactive with various molten metals. Since the crystalline grains are not grown largly, they are easily wettable with various metals. Moreover, they have a density of about 2.5 to 3.5 g/cm$^3$ and are light in weight. These properties may vary depending on the silica content of the fibers, and it has been found by the present inventors that the fibers have the most preferable properties, when the silica content is not more than 28% by weight, preferably in the range of 2 to 25% by weight.

The alumina fiber and alumina-silica fiber can be prepared by various methods. For example, a viscous solution containing an aluminum compound (e.g. alumina sol, aluminum salt, etc.), a silicon compound (e.g. silica sol, ethyl silicate, etc.) and an organic high molecular compound (e.g. polyethylene oxide, polyvinyl alcohol, etc.) is spun to give a precursor fiber, and then the precursor fiber thus obtained is calcined in air at a temperature lower than the temperature at which α-alumina reflection appears by X-ray diffraction. Alternatively, the fibers may be prepared by immersing an organic fiber into a solution containing an aluminum compound and a silicon compound and then calcining in air.

The most suitable alumina fiber and alumina-silica fiber can be prepared by the method as disclosed in U.S. Pat. No. 4,101,615. That is, a solution containing a polyaluminoxane and desirably a silicon compound is spun to give a precursor fiber, and the precursor fiber is calcined in air. The calcining should be done at a temperature at which no α-alumina reflection is observed by X-ray diffraction.

In order to improve the properties of the resulting alumina or alumina-silica fiber, it is preferable to add to the spinning solution a small amount of one or more kinds of the compounds containing an element such as lithium, beryllium, boron, sodium, magnesium, phosphorus, potassium, calcium, titanium, chromium, manganese, yttrium, zirconium, barium, lanthanum, or tungsten.

The alumina or alumina-silica fiber obtained by the method as described in U.S. Pat. No. 4,101,615 has a fiber diameter of 0.6 to 400 μm, a tensile strength of 10 to 30 t/cm$^2$, a tensile modulus of 1,000 to 3,000 t/cm$^2$ and is stable in air at a temperature of 1,000° C. or higher for a long period of time. Such a fiber is the most suitable for the production of the desired fiber-reinforced metallic composite material of the present invention.

It is effective to coat the surface of the alumina or alumina-silica fiber with metals such as nickel or titanium or ceramics as mentioned above, by which the reaction between the fiber and metal is controlled and the wettability between them is also improved, and thereby the reinforcing effect of the fiber is enhanced.

In order to obtain various fiber-reinforced metallic composite materials suitable for individual utility, the alumina or alumina-silica fiber may be used together with other inorganic fibers such as boron fiber, graphite fiber, whisker or metallic fibers such as stainless steel fibers.

The fibers to be used for reinforcing may be in various shapes such as continuous fiber, long fiber, short fiber or whisker. However, in the case of a short fiber or whisker, they should have an aspect ratio (i.e. ratio of fiber length to fiber diameter) of 10 or more, preferably 50 or more, in view of the mechanism of composite-forming.

The number of filaments in the fiber bundle is not critical, but a wide range of number of filaments, i.e. from monofilament (single) to 200,000 filaments (like carbon fibers) may be applicable. It has been however, found that it is particularly referred to use a fiber bundle containing filaments of 30,000 or less in order to impregnate uniformly the matrix among the fibers.

The matrix metal to be reinforced with fibers should have a melting point of not higher than 1,700° C. in view of the lowering of strength at high temperature of the fiber. Suitable examples of the metal to be used as a matrix are single metals such as beryllium, magnesium, calcium, strontium, barium, scandium, yttrium, lanthanum, titanium, manganese, iron, cobalt, nickel, palladium, copper, silver, gold, zinc, cadmium, aluminum, gallium, indium, thallium, silicon, germanium, tin, lead, bismuth, selenium, or tellurium; and alloys of various metals such as copper-zinc alloys (e.g. brass), copper-tin alloys (e.g. phosphor bronze), copper-tin-phsophorus alloys, aluminum-copper alloys (e.g. duralumin), aluminum-magnesium-copper alloys, aluminum-zinc alloys, aluminum-silicon alloys, nickel-aluminum alloys, or nickel-aluminum-copper alloys. The matrix of these metals may be incorporated with a few or several % by weight of one or more other elements such as chromium, titanium, zirconium, magnesium, tin, or lithium in order to improve the wettability thereof or to inhibit the reaction between the fiber and matrix metal.

The most suitable metal for the matrix should be selected after taking into consideration the following factors. In case the composite material should have the greatest strength with a light weight, magnesium, aluminum or alloys thereof (e.g. aluminum-magnesium-copper-manganese alloy such as duralumin) are preferable, and in case the composite material should have particularly high heat resistance, copper, nickel, titanium, cobalt or alloys of these metals are preferable. For instance, alumina fiber-reinforced aluminum or aluminum alloy has favorably no brittleness at low temperature, contrary to steel. Moreover, from the standpoint of easy production of FRM, aluminum-silicon (12%) alloys (e.g. silumin) are preferable because of the good fluidity of molten metal.

With increase of the content by volume of inorganic fiber or alumina or alumina-silica fiber in the composite material, the strength and modulus of elasticity of the composite material is favorably increased. However, the content by volume of fiber is at maximum 68% in case of composite material obtained by unidirectionally arranging continuous fibers or long fibers and 45% in the case of a composite material obtained by arranging at random short fibers. When the content by volume of fiber is over the above maximum value, the composite material tends to decrease the tensile strength and bending strength.

Spring materials of the fiber-reinforced metallic composite material can be produced by all conventional methods which are applicable to the produciton of the conventional FRM spring materials, for example, (1) a liquid phase method such as molten metal infiltration method, (2) a solid phase method such as diffusion bonding (3) powder metallurgical technique (e.g. sintering, welding), (4) deposition (e.g. plasma spraying, electrodeposition, chemical vapor deposition), and (5) a plastic processing method (e.g. extrusion, hot rolling). For example, a material for leaf springs can be produced by the above methods (1), (2), (3), (4) and rolling (5). Besides, a coil spring can be produced by forming the composite material into a wire by the hot extrusion (5) and then forming the wire into the desired coil shape. Other springs having various shapes can also be produced by applying the conventional metal processing techniques to the FRM spring materials obtained by the above methods.

According to the present invention, the following various characteristics can be achieved.

The springs made of the fiber-reinforced metallic composite material of the pesent invention are lighter and have greater mechanical properties in comparison with the conventional metallic springs. The FRM springs of the present invention are superior to the conventional metallic springs and FRP springs in that they have far greater heat resistance from a lower temperature to a higher temperature. The upper limit of temperature showing enough heat resistance is just below the melting point of the matrix metal, at which the matrix metal looses almost all of the mechanical properties thereof. For instance, in case of pure aluminum (melting point: 660° C.), the spring can be used even at 600°-620° C. while maintaining its strength, like at room temperature, unless it is used for a long period of time. Moreover, the FRM spring material of the present invention has a superior modulus of elasticity. For example, in the case of using a fiber having a tensile modulus of more than 4,000 t/cm², such as boron fiber, silicon carbide, coated boron fiber, tungsten fiber or alumina whisker, an FRM spring material having a fiber content of 50% by volume shows far greater modulus of elasticity than that of the conventional metallic spring materials (1,900–2,100 t/cm²).

The composite material obtained by reinforcing a metal having a melting point of not higher than 1,700° C. with the alumina or alumina-silica fiber of the present invention has the following characteristics. The alumina or alumina-silica fiber is obtained in the form of a continuous fiber which is easily handled contrary to whisker and has far greater flexibility than boron fiber and has also an excellent oxidation resistance even at a high temperature which is not observed in a boron fiber and a carbon fiber. Accordingly, the composite material using the alumina or alumina-silica fiber can easily be produced. Moreover, the alumina or alumina-silica fiber is hardly reactive with various metals and has excellent mechanical properties, and hence, the composite material obtained therefrom has large specific strength, large specific modulus of elasticity at a wide range of temperature of from room temperature to a higher temperature and has also excellent creep characteristics at a high temperature and execellent fatigue properties.

Thus, the present invention can provide a spring which is light in weight and has excellent heat resistance, high strength (high specific strength) and high modulus of elasticity (high specific modulus of elasticity) at a wide range of temperature. According to the present invention, not only the machine part or element (spring) itself is reduced in weight, but also the machines or apparatuses and whole system in spaceship, atomic power machines, natural gas tanks, automobiles, and the like can be improved, which results in saving energy and saving resources.

The present invention is illustrated by the following Examples but is not limited thereto.

EXAMPLE 1

A bundle of continuous alumina-silica fiber [$Al_2O_3$: 85% by weight, $SiO_2$: 15% by weight, average fiber diameter: 17 μm, number of filaments: 200, density: 3.05 g/cm³, tensile strength: 22.3 t/cm² (length of gauge for measurement: 20 mm), elasticity modulus: 2,350 t/cm²] was wound onto a mandrel in a single layer, in parallel and in the same pitch. The mandrel wound with bundle of fiber was immersed in a suspension of aluminum powder (purity: 99.9%, average particle size: 5 μm) in methyl ethyl ketone and then dried at room temperature. The resulting mandrel was further immersed in a suspension of aluminum powder (average particle size: 44 μm) in a resin solution, and air-dried. The composite material thus obtained was cut open into a sheet-like form and further cut in a size fit to a hot pressing mold. 20 sheets of the composite material were unidirectionally piled up within the hot pressing mold. The hot pressing was carried out by firstly heating under vacuum at 500° C. for 30 minutes to evaporate the solvent and to decompose the polymer and then pressing the sample under a pressure of 50 kg/cm² at 665° C. for 1 hour under vacuum or under atmosphere of an inert gas so that the sheets were bonded each other and the matrix metal was sufficiently impregnated among the fibers to give a plane plate of FRM material having a shape of 150 mm square and a thickness of 2.1 mm. This FRM material had a content of fiber of 51% by volume, which was confirmed by melting the matrix metal.

A test sample for measurement of tensile strength and bending strength was prepared by cutting the FRM plate obtained above. As a result of the measurement at room temperature, it showed specific weight: 2.9 g/cm², tensile strength: 102 kg/mm², bending strength: 143 kg/mm², and modulus of elasticity: $1.45 \times 10^4$ kg/mm². Thus, this FRM material had a specific strength (tensile strength/density) of about 5 times of that of stainless steel and a specific modulus of elasticity (modulus of elasticity/density) of about double of that of Inconel 600 which is representative example of heat resistant alloy. Thus, this FRM material showed excellent properties which can not be seen in the conventional spring materials even at room temperature.

A test sample for measurement of fatigue under tension was prepared from the above FRM material. The fatigue strength was measured by using SERVOPULSER EHF-5 type fatigue tester (made by Shimadzu Seisakusho) under conditions of a temperature: 25° C., repeating frequency: 30 Hz, output wave pattern: sine wave (load control). By varying the amplitude of the repeating stress (S), the number (N) of repeating until the test sample was broken because of fatigue was measured, and an S-N curve was drawn based on the resulting data. It is clear from the test results that when the sample was broken due to fatigue at N=10⁷, the stress was extremely high such as 69-73% of the static tensile strength. This characteristic is not seen in case of the conventional composite metals and alloys.

By observing the station of breaking with tension and bending with an electron microscope, it was confirmed that the fibers were uniformly distributed in the matrix and there was extremely few void.

EXAMPLE 2

In the same manner as described in Example 1, a plate of a composite material of alumina-silica fiber/Al (purity: 99.9%) was produced. The FRM material had a content of fiber of 49% by volume. Ten test samples for measurement of tensile strength at a high temperature was prepared by cutting the composite material plate. Each sample had a width of 10 mm, a length of 66 mm and a thickness of 1.5-2.3 mm.

The tensile strength at a high temperature was measured by using a test sample waisted on 18 mmR at the center to a width of 4-6 mm. The modulus of elasticity at a high temperature was measured by bonding a strain gauge KH-3-G3 (made by Kyowa Dengyo) to the sample with changing the load at a certain temperature. Heating was carried out with a high-frequency induction furnace provided to the tensile tester with controlling the temperature within the range of 600° C.±5° C.

Figure 2:
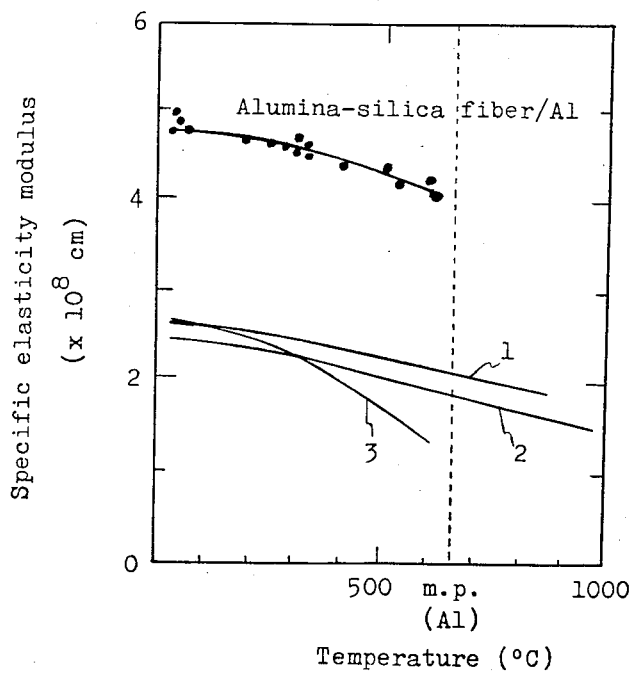
FIG. 2 shows the temperature dependence of specific modulus of elasticity.

The temperature dependence of these specific tensile strength and specific modulus of elasticity was compared with those of other conventional metals and alloys. The results are shown in the accompanying FIG. 1 and FIG. 2. FIG. 1 shows the temperature dependence of specific tensile strength of the alumina-silica fiber-reinforced aluminum composite material of Example 2 together with the data of conventional metals and alloys. In FIG. 1, (1) is the data of Hastelloy X, (2) is the data of stainless steel, (3) is the data of pure titanium, and (4) is the data of ultra super duralumin, and m.p. means the melting point of aluminum. FIG. 2 shows the temperature dependence of specific modulus of elasticity of FRM of Example 2, wherein (1) is the data of Inconel 600, (2) is the data of Hastelloy X, and (3) is the data of pure aluminum. As is clear from these results, the composite material of the present invention has novel characteristics suitable for using as a spring material having light weight and excellent heat resistance.

EXAMPLE 3

In the same manner as described in Example 1, a bundle of continuous alumina-silica fiber was wounded onto a mandrel in a single layer. With rotating the mandrel, aluminum powder (purity: 99.9%, average particle size: 5 μm) was plasma-sprayed onto the surface of alumina-silica fiber with a plasma spraying device (6MR-630 type equipped with an electric power supplier, made by Metco Co.). The plasma spraying was carried out in a mixture of argon and hydrogen (flowing ratio: 30:1) in a spraying distance of 22 cm for 80 seconds. After taking off the sheet from the mandrel, plasma spraying was also done onto the reverse surface for 30 seconds in the same manner as described above. The resulting sheet-like composite material had a thickness of 0.32 mm in average. The sheet-like composite material was cut into a size of 10 mm×66 mm, and 21 sheets were unidirectionally piled up within a curved carbon hot pressing mold (length of: 68 mm, width: 10 mm, curvature radius: 90 mm). The hot pressing was carried out by pressing under a pressure of 50 kg/cm² at 670° C. under argon atmosphere for 30 minutes. After cooling, there was obtained a curved plate of alumina-silica fiber-reinforced aluminum composite material having a thickness of 1.33 mm and a content of fiber of 50% by volume. This is used as a machine element, of so-called leaf spring.

Figure 3:
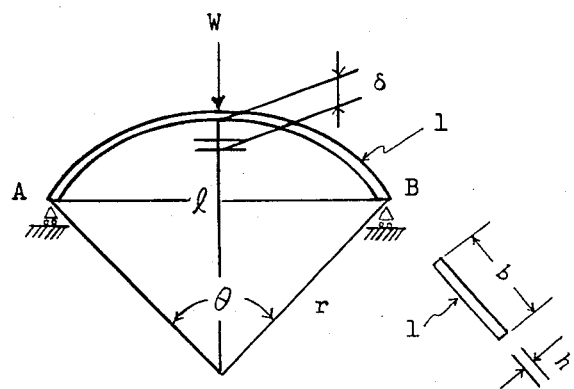
FIG. 3 shows measurement of deflection at the loading point.

A load (W) was repeatedly added to the curved FRM plate obtained above as shown in the accompanying FIG. 3 wherein (1) is the curved FRM plate, and the deflection (δ) at the loading point at the middle of the plate was measured. As a result, a spring coefficient was obtained with good reproducibility. That is, in case of the FRM plate of a width: b, a thickness: h, a curvature radius: r, and the length of A B: l, and the both end point of A and B being a movable supporting point and the friction between the plate and the supporting point being ignored, the relation between the load weight (W) and the deflection (δ) at the central area of the plate, i.e. the spring coefficient, is theoretically shown by the following equation:

$$\frac{W}{\delta} = \frac{1}{\alpha} \cdot \frac{Ebh^3}{l^3} \quad (1)$$

wherein $$\alpha = \frac{3}{16} \cdot \frac{3\sin\theta - 8\sin\theta/2 + (2 - \cos\theta)\cdot\theta}{\sin^3\theta/2} \quad (2)$$

$$\theta = 2\sin^{-1}(l/2r) \quad (3)$$
$$E = E_f V_f + E_m(1 - V_f) \quad (4)$$

E means a modulus of elasticity, f means a fiber, m means a matrix metal, and $V_f$ means a content by volume of the fiber.

Figure 4:
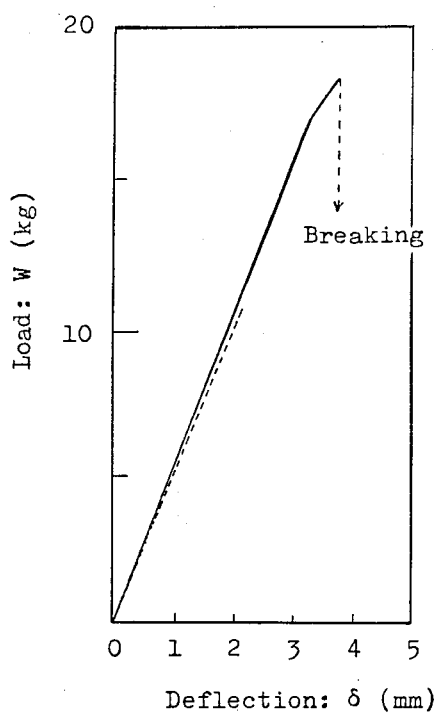
FIG. 4 shows the load-deflection curve.

In accordance with the above equation (1), the theoretical load-deflection curve is drawn based on the data obtained above. The curve is shown in a dotted line in the accompanying FIG. 4. The curve of found data is also shown in FIG. 1 in a solid line. The theoretical value shown by the dotted line well corresponds to the found value shown in a solid line. In the case, the composite material had a specific modulus of elasticity of 5.0×10⁸ cm and a bending strength of 102 kg/cm².

EXAMPLE 4

Carbon fibers T-300 (made by Toray Co., average fiber diameter: 6.9 μm, number of filaments: 3,000, tensile strength: 27 t/cm², tensile modulus: 2,500 t/cm²) were electroplated with copper with an electrolytic cell containing copper sulfate of 200 g/liter and sulfuric acid 50 g/liter under the conditions of an electrolytic temperature of 20° C., a current density of 0.5 A/dm² and a period of time: 5 to 10 minutes, by which the surface of carbon fibers were uniformly coated with copper in a thickness of 0.6 μm in average. This was confirmed by observing it with a scanning electron microscope and a X-ray photoelectron spectrophotometer (ESCA 650B, made by Shimadzu Seisakusho-DuPont).

The carbon fibers coated with copper were cut in a length of 2.5 mm with a roving cutter. The resulting fibers were provided within a mold having a cavity of diameter: 8 mmφ and length: 150 mm, so that the content of fiber became 30% by volume. To the mold was added molten Al-Cu (33%) alloy in vacuum at 615° C. After keeping for 1 minute, the product was immediately hardened with water to give a rod-like, copper-coated carbon fiber-reinforced Al-Cu alloy composite material. The resulting composite material was preheated at 455° C. for 30 minutes and was subjected to hot-extrusion molding under the conditions of extrusion rate: 5.0 mm/minute and extrusion pressure: 2,000 kg/cm$^2$ to give a copper-coated carbon fiber-reinforced Al-Cu alloy composite material in the form of a wire having a diameter of 3.7 mm$\phi$. The distribution of fibers was checked by abrading the wire in parallel to the axis. As a result, it was confirmed that the fibers were arranged in the direction of the extrusion axis. Moreover, when the wire immediately after extruded from the extrusion nozzle was passed through a curved, stainless steel heating guide and was air-cooled, there was obtained a coil spring having an outer diameter of 60 mm$\phi$ and a pitch interval of 5 mm.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A heat resistant leaf spring or coil spring exhibiting excellent creep characteristics, fatigue properties and impact resistance at high temperatures comprising a fiber-reinforced metallic composite material including a metal matrix having a melting point of not higher than 1700° C. reinforced by an inorganic fiber having a high specific modulus of elasticity and a high specific strength comprising an alumina-silica fiber containing from about 98 to 75 percent by weight of Al$_2$O$_3$ and 2 to 25 percent by weight of SiO$_2$, said fiber having substantially no $\alpha$-alumina reflection by X-ray diffraction.

2. A spring according to claim 1, wherein said reinforcement fiber is coated with a metal or ceramic compatible with said metal matrix.

3. A spring according to claim 1, wherein said alumina-silica fiber contains one or more kinds of oxides of an element selected from the group consisting of lithium, beryllium, boron, sodium, magnesium, silicon, phosphorus, potassium, calcium, titanium, chromium, manganese, yttrium, zirconium, lanthanum, tungsten and barium in an amount within the content of SiO$_2$ and within not more than 10 percent by weight based on the total weight of the fiber.

* * * * *